Oct. 5, 1954 R. F. SCHWARTZ 2,691,138

OSCILLATOR FREQUENCY CONTROL

Filed Oct. 13, 1953 2 Sheets-Sheet 1

INVENTOR.
Richard F. Schwartz

BY F. A. Rechif
AGENT

INVENTOR.
Richard F. Schwartz

BY F. A. Rechif
AGENT

Patented Oct. 5, 1954 2,691,138

UNITED STATES PATENT OFFICE 2,691,138

OSCILLATOR FREQUENCY CONTROL

Richard F. Schwartz, Philadelphia, Pa., assignor to Radio Corporation of America, a corporation of Delaware Application October 13, 1953, Serial No. 385,775

12 Claims. (Cl. 332—5)

This invention relates to the frequency control of oscillation generators, and more particularly to the frequency control or stabilization of ultra-high frequency (UHF) or microwave oscillators, such as magnetrons.

This invention is related to and constitutes an improvement over that disclosed in the copending Koros application, Serial No. 177,455, filed August 3, 1950. Said application discloses arrangements for the frequency stabilization of magnetrons by means of the so-called "injection locking" process, in which a small amount of power from a stable frequency source (the frequency of which is harmonically related to the magnetron frequency) is injected into a magnetron oscillator in order to lock the frequency of the high-power magnetron. In the aforementioned Koros system, it has been found under conditions of amplitude or anode modulation, that the input impedance presented by the magnetron to the injection power source varies during the modulation cycle. This means that there is a change of loading on the injection source during the modulation cycle, resulting in a change in the effective injection power applied to the magnetron during the modulation cycle. This is disadvantageous since it reduces the effectiveness or the efficiency of the frequency stabilization process.

Therefore, an object of this invention is to devise for oscillators an injection locking system which functions to maintain the injection power applied to the oscillator substantially constant, irrespective of changes in the impedance presented to the injection power source by the oscillator.

Another object is to provide an injection locking system for modulated magnetron oscillators which operates to maintain the injection power applied to the magnetron substantially constant throughout the modulation cycle.

The objects of this invention are accomplished, briefly, in the following manner: two sources of stable frequency injection power are utilized, coupled at spaced points to the main transmission line (the line between the magnetron oscillator and its load). The combination of the two sources gives a "virtual" injection point that can shift, if the magnetron requires it. Alternatively, a single injection source can be utilized, coupled to the main transmission line at two spaced points by means of separate branch transmission lines.

The foregoing and other objects of this invention will appear from a reading of the following description of some exemplifications thereof, reference being had to the accompanying drawings, wherein.

Figure 1:
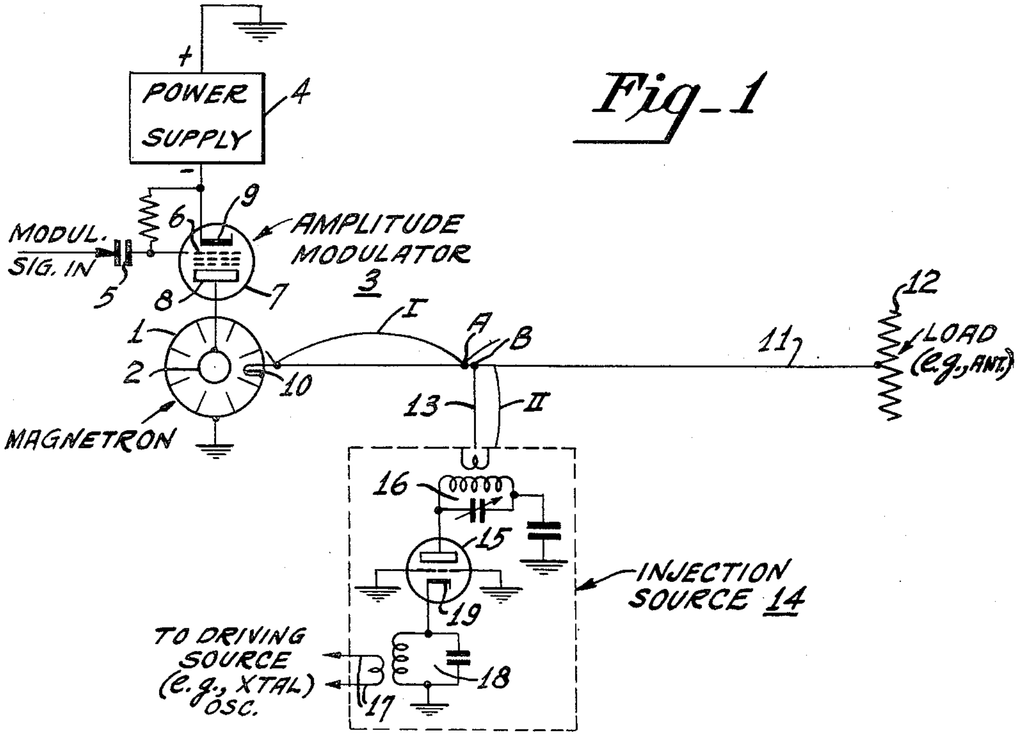
Fig. 1 is a diagrammatic representation of a known injection locking system.

Referring to Fig. 1, magnetron 1 has a conventional cathode 2 (the outer shell or anode of the magnetron being grounded as shown) which is connected through an amplitude modulator 3 to the negative terminal of a high voltage unidirectional power supply 4 the positive terminal of which is grounded as indicated. Thus, magnetron 1 is energized to generate oscillatory energy at a frequency determined mainly by the parameters of magnetron 1. A modulating signal, such as a television video signal for example, is fed from a signal source through a coupling capacitor 5 to the control grid 6 of a vacuum tube 7, for example a pentode as shown, which constitutes amplitude modulator 3. The anode 8 of pentode 7 is connected directly to magnetron cathode 2, while the cathode 9 of said pentode is connected directly to the negative terminal of power supply 4. Thus, tube 7 of modulator 3 is connected in series in the cathode circuit of magnetron 1, so that such magnetron may be considered to be anode-modulated. Because the cathode, of necessity, is in the anode circuit, the modulator 3 is, in effect, in the anode-cathode circuit of magnetron 1.

Magnetron 1 is provided with the usual output or load coupling loop 10 by means of which oscillatory energy is abstracted from such magnetron and fed by means of a main transmission line 11 to a load 12 which may be, for example, a transmitting antenna. Line 11 is indicated schematically as including only a single conductor, but this line is preferably a coaxial line, or it may be a waveguide.

A branch transmission line 13, which is indicated schematically as including only a single conductor but which may be a coaxial line or a waveguide, is coupled to the main line 11 at junction point B, in order to effect injection of stable frequency power into the main line and into magnetron 1. An injection source 14, illustrated inside the dotted-line box in Fig. 1, is coupled to that end of branch line 13 opposite to point B. Source 14 feeds injection power into main line 11 and magnetron 1 by means of branch line 13. Source 14 may include, for purposes of illustration, a grounded-grid amplifier tube 15 having a tuned output circuit 16 which is inductively coupled to branch transmission line 13 and is tuned to a frequency harmonically related to the desired frequency of operation of magnetron oscillator 1. Amplifier tube 15 is driven from a suitable stable frequency driving source, such as a crystal oscillator, by means of a coupling including leads 17 which inductively couple oscillatory energy to the inductive portion of an LC network 18 connected to the cathode 19 of tube 15.

Fig. 1 illustrates an amplitude modulated magnetron oscillator which is injection locked by injection source 14, in order to stabilize its frequency of operation. In other words, injection power is fed into the magnetron 1 to effect stabilization of its output frequency in response to the output of a stable-frequency crystal oscillator. Fig. 1 discloses a system of the prior art, as exemplified by the aforementioned Koros application, and for further details concerning the operation thereof, reference may be had to the said copending application.

In Fig. 1, curve I represents the injection voltage distribution on a portion of the main transmission line 11, while curve II represents the injection voltage distribution on the branch line 13. The voltage distribution thus represented is the voltage produced by the injection source 14 acting as a generator. Point A is a "zero" or voltage minimum point of the standing wave I resulting from the injection power applied to the magnetron. It has been found, by means of measurements made on the system of Fig. 1, that the magnitude of the input impedance of the magnetron 1 to the injected signal (that is, the impedance presented by the magnetron to the injection source generator) varies during the modulation cycle. The magnetron 1 is the termination of the transmission line from the injection source 14, considered as a generator, and therefore the magnetron influences the position and also the magnitude of the voltage minimum along the line 11. As the magnitude of the magnetron input impedance varies (during the modulation cycle) the magnitude and position of the minimum in the voltage standing wave generated by the injection source must likewise change. Thus, point A shifts during the modulation cycle. For example, in one case measured (using the system of Fig. 1) it was found that the input impedance of the magnetron at the crest of the modulation cycle was $23.3\underline{/-84.3^\circ}$ ohms, while at the trough of the modulation cycle it was $11.9\underline{/-84.9^\circ}$ ohms. This corresponds to a shift in point A of .0325 wavelength. This shift, though small, causes a change in the loading of the injection source, resulting in a change in the effective injection power applied to the magnetron during the modulation cycle. This change in injection power is undesirable, and is reduced substantially by the arrangement of this invention.

Moreover, points A and B (the latter of which, it will be remembered, is the junction point between the main transmission line 11 and the branch transmission line 13) do not ordinarily coincide. In the aforementioned tested case, neither of the positions of point A (that is, neither its position at the crest of the modulation cycle nor its position at the trough of the modulation cycle) corresponded to the position of point B.

Figure 2:
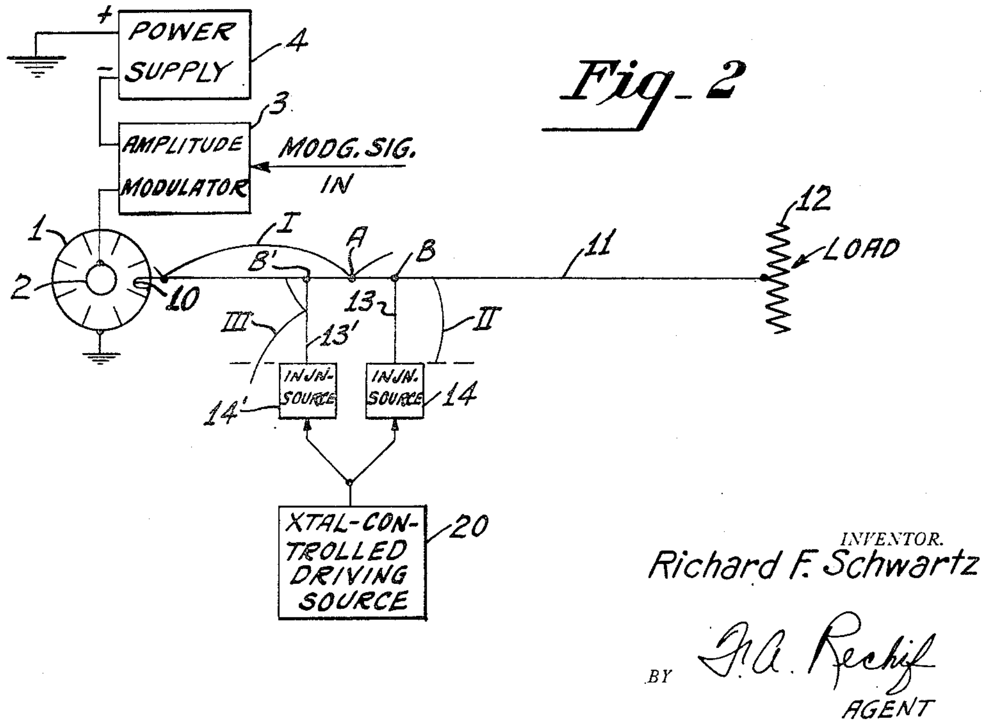
Fig. 2 is a similar diagram of a system according to the invention.

Fig. 2 discloses an arrangement according to this invention. In this figure, elements the same as those of Fig. 1 are denoted by the same reference numerals. In Fig. 2, two separate injection sources 14 and 14′ are utilized to feed injection power into the magnetron 1. Each of these sources may, if desired, be exactly similar to injection source 14 in Fig. 1, and the two injection sources are both driven from a common crystal-controlled driving source 20, for example a crystal-controlled frequency multiplier chain.

The output of injection source 14 is applied to the magnetron 1 by means of a branch transmission line 13 connected to source 14 and joined to the main line 11 at point B, while the output of injection source 14′ is applied to magnetron 1 by means of a separate branch transmission line 13′ connected to source 14′ and joined to the main line 11 at point B′. Points B and B′ are located some distance apart, for example a quarter-wavelength at the frequency of magnetron oscillator 1. Also, according to this invention, points B and B′ are so located that point A (the "zero" or voltage minimum point of the standing wave I resulting from the injection power applied to the magnetron) is between points B and B′. In Fig. 2, curve II represents the injection voltage standing wave distribution on branch line 13, while curve III represents the injection voltage standing wave distribution on branch line 13′.

In Fig. 2, the two injection sources 14 and 14′, which are operating at the same frequency since they are both driven by the same driving source 20, both combine to effect injection locking (and thereby also frequency stabilization) of the magnetron 1. If there is any tendency for the input impedance of the magnetron to vary during the modulation cycle, the voltage minimum point A will tend to shift in position, as previously described in connection with Fig. 1. As the voltage minimum point A of the injection voltage standing wave I shifts, each of the injection sources 14 and 14′ sees a changed impedance. Therefore, unless these sources have zero internal impedance (which they ordinarily do not) they must supply either more or less volt-amperes, depending upon how their loadings have changed. Since point A is between points B and B′, as this point shifts it approaches nearer one of the branch line junctions B or B′ and recedes further from the other such junction; thus, the loadings of the two sources 14 and 14′ move in opposite directions as point A shifts, and the source whose branch line junction is closest to the voltage minimum A will see the lower impedance while the other source will see the higher impedance. Since the loadings of the two injection sources 14 and 14′ thus move in opposite directions as point A shifts during the modulation cycle, one such source will tend to deliver fewer volt-amperes to the magnetron, whereas the other source will tend to deliver more volt-amperes. Hence, the volt-amperes available for injection locking will be much more nearly constant during the modulation cycle with the locking system of Fig. 2 than with the locking system of Fig. 1.

The action of the Fig. 2 system may be expressed in another way. The combination of the two injection sources 14 and 14′ gives a "virtual" injection point that can shift, if required to by changes in the magnetron input impedance.

Figure 3:
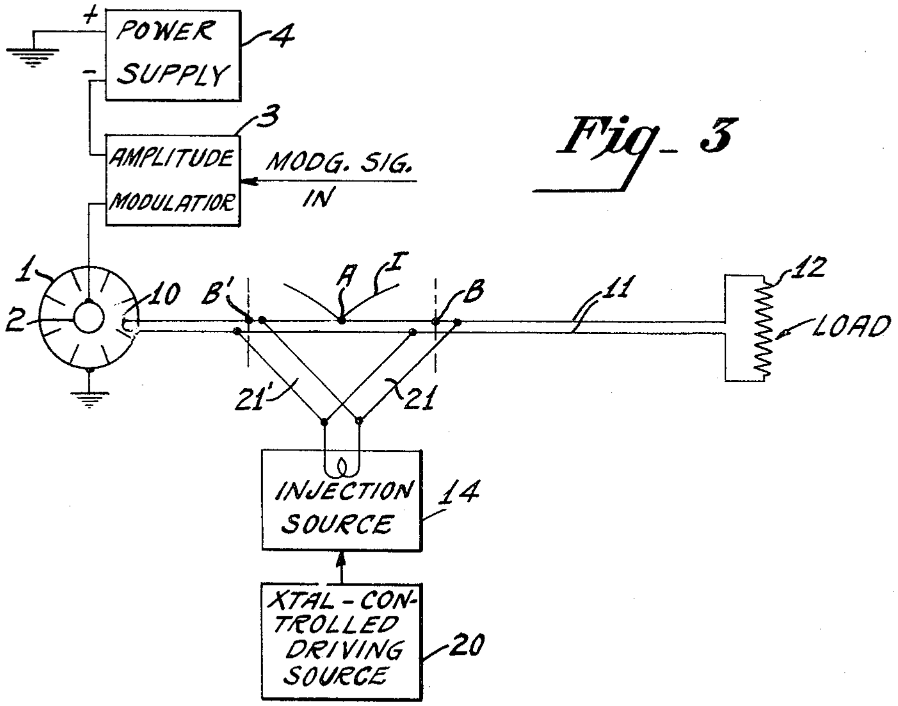
Fig. 3 is a diagram of a modified system, using only one injection source.

Fig. 3 is a modified system. In Fig. 3, only a single injection source 14 is utilized, but this source feeds injection power to the main transmission line 11 (and thereby also to the magnetron 1) by means of a branch transmission line constituted by two separate arms 21 and 21′ which are joined to the main line at two spaced points B and B′. Points B and B′ are again located some distance apart, and point A (the minimum voltage point of the standing wave I resulting from the injection power applied to the magnetron) is between points B and B′. The distances along the two arms 21 and 21′, from the respective junctions B and B′ to the injection source 14, are equal to each other.

The action in Fig. 3 is quite similar to that in Fig. 2. As the voltage minimum point A shifts or tends to shift, a changed impedance will be presented to each of the arms 21 and 21′. The impedance changes thus presented to the two arms are in opposite directions. Since the impedances presented to the two arms 21 and 21′ thus change in opposite directions as point A shifts during the modulation cycle, one such arm will tend to carry fewer volt-amperes to the magnetron, whereas the other arm will tend to carry more volt-amperes. Thus, the "virtual" injection point resulting from the combination of the two injection points B and B′ shifts as point A shifts, giving a very nearly constant injection locking power throughout the modulation cycle.

Figure 4:
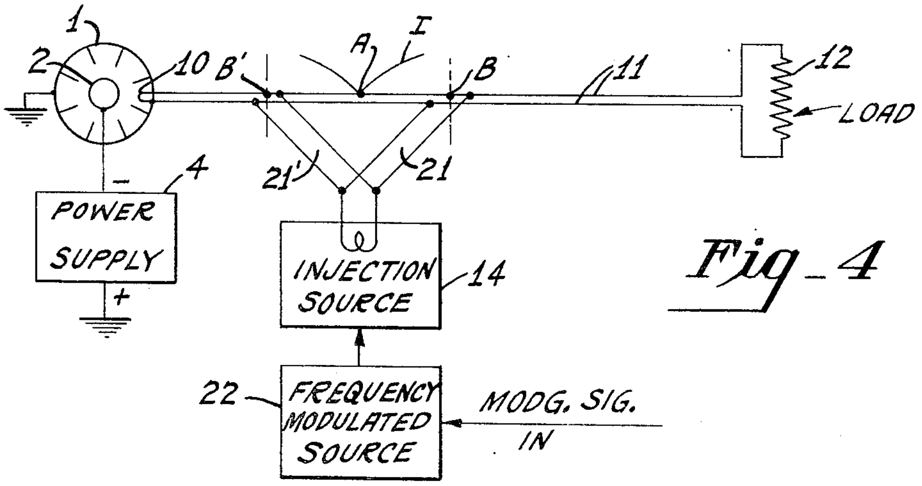
Fig. 4 is a similar diagram of a modification of Fig. 3.

Fig. 4 is a modification of Fig. 3. In Figs. 1, 2 and 3, amplitude modulation of the magnetron is effected. However, in Fig. 4 angular modulation of the magnetron, with stabilization of the mean frequency, is carried out. In Fig. 4, the magnetron cathode 2 is connected directly to the negative terminal of power supply 4, and no amplitude modulator is utilized. A single injection source 14 is utilized, feeding power to the main transmission line 11 by means of two separate arms 21 and 21′ joined to the main line at two spaced points B and B′, exactly as in Fig. 3.

In Fig. 4, the injection source, instead of being driven by a crystal-controlled (fixed-frequency) driving source, is driven by an arrangement which includes a means for producing angular modulation of the locking source. For example, and as illustrated, the means for producing angular modulation of the locking source may consist of a frequency modulated source driver 22 to which a modulating signal is fed, which source driver 22 includes therein any suitable means for stabilizing the center (or rest) frequency of the same. Since the injection source is thus angularly modulated by its driving source 22, the magnetron will follow the instantaneous angle of the injection voltage. At the same time, the center (rest or unmodulated) frequency of the magnetron is stabilized due to the injection locking action of injection source 14.

Alternatively, the means for producing angular modulation of the locking source may consist of a crystal controlled frequency multiplier chain (for driving the injection source) which is phase modulated at some intermediate point. Any other angle modulated source will work equally well.

The present invention is not limited to oscillators of the magnetron type. It can be applied to oscillators of any type capable of being "locked" in frequency.

What is claimed is:

1. A frequency control arrangement comprising an oscillator whose frequency is to be controlled, a transmission line coupling the output of said oscillator to a load, and means for coupling injection power of stable frequency into said line at two separate spaced points thereon, said points being so positioned that a voltage minimum of the standing wave pattern set up by said injection power is located between said two points.

2. An arrangement as defined in claim 1, wherein the oscillator is a magnetron oscillator.

3. An arrangement as defined in claim 1, wherein the said means comprises two sources of injection power the outputs of which are coupled to said transmission line at spaced points thereon, by means of separate respective output couplings.

4. An arrangement as defined in claim 1, wherein the said means comprises a source of injection power the output of which is coupled to said transmission line at spaced points thereon, by means of two separate couplings.

5. An arrangement as defined in claim 1, wherein the oscillator is a magnetron oscillator and wherein the said means comprises two sources of injection power the outputs of which are coupled to said transmission line at spaced points thereon, by means of separate respective output couplings.

6. An arrangement as defined in claim 1, wherein the oscillator is a magnetron oscillator and wherein the said means comprises a source of injection power the output of which is coupled to said transmission line at spaced points thereon, by means of two separate couplings.

7. A frequency control arrangement comprising a diode cavity-type oscillator whose frequency is to be controlled, means for amplitude modulating the output of said oscillator in accordance with a modulating signal, a transmission line coupling the output of said oscillator to a load, and means for coupling injection power of stable frequency into said line at two separate spaced points thereon, said points being so positioned that a voltage minimum of the standing wave pattern set up by said injection power is located between said two points.

8. An arrangement as defined in claim 7, wherein the oscillator is a magnetron oscillator.

9. An arrangement as defined in claim 7, wherein the means for coupling injection power comprises two sources of injection power the outputs of which are coupled to said transmission line at spaced points thereon, by means of separate respective output couplings.

10. An arrangement as defined in claim 7, wherein the means for coupling injection power comprises a source of injection power the output of which is coupled to said transmission line at spaced points thereon, by means of two separate couplings.

11. An arrangement as defined in claim 7, wherein the oscillator is a magnetron oscillator and wherein the means for coupling injection power comprises two sources of injection power the outputs of which are coupled to said transmission line at spaced points thereon, by means of separate respective output couplings.

12. An arrangement as defined in claim 7, wherein the oscillator is a magnetron oscillator and wherein the means for coupling injection power comprises a source of injection power the output of which is coupled to said transmission line at spaced points thereon, by means of two separate couplings.

References Cited in the file of this patent

UNITED STATES PATENTS

| Number | Name | Date |
|---|---|---|
| 2,620,467 | Donal | Dec. 2, 1952 |
| 2,677,058 | Kirkman | Apr. 27, 1954 |